(12) United States Patent
Cooper

(10) Patent No.: US 10,110,880 B2
(45) Date of Patent: Oct. 23, 2018

(54) SELECTIVE COLORIZATION USING MONOCHROMIC IMAGERY

(71) Applicant: Amazon Technologies, Inc., Seattle, WA (US)

(72) Inventor: Ted Cooper, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 340 days.

(21) Appl. No.: 14/866,422

(22) Filed: Sep. 25, 2015

(65) Prior Publication Data

US 2017/0094258 A1    Mar. 30, 2017

(51) Int. Cl.
| | |
|---|---|
| *H04N 13/257* | (2018.01) |
| *H04N 13/02* | (2006.01) |
| *H04N 9/09* | (2006.01) |
| *H04N 13/239* | (2018.01) |
| *H04N 5/232* | (2006.01) |
| *H04N 5/33* | (2006.01) |
| *H04N 9/04* | (2006.01) |

(52) U.S. Cl.
CPC ....... *H04N 13/257* (2018.05); *H04N 5/23245* (2013.01); *H04N 5/332* (2013.01); *H04N 9/045* (2013.01); *H04N 9/09* (2013.01); *H04N 13/0239* (2013.01); *H04N 13/0257* (2013.01); *H04N 13/239* (2018.05)

(58) Field of Classification Search
CPC ...... H04N 5/23245; H04N 5/332; H04N 9/09; H04N 13/0239; H04N 13/0257; H04N 9/045; H04N 2209/048
See application file for complete search history.

(56) References Cited

U.S. PATENT DOCUMENTS

| | | | |
|---|---|---|---|
| 5,475,428 A | 12/1995 | Hintz et al. | |
| 2002/0003571 A1* | 1/2002 | Schofield | ................ B60C 23/00 348/148 |

(Continued)

FOREIGN PATENT DOCUMENTS

| | | |
|---|---|---|
| EP | 2221765 A1 | 8/2010 |
| WO | WO2012117235 A2 | 9/2012 |

OTHER PUBLICATIONS

PCT Search Report and Written Opinion dated Dec. 20, 2016 for PCT Application No. PCT/US16/53530, 11 pages.

*Primary Examiner* — Sathyanaraya V Perungavoor
*Assistant Examiner* — Peet Dhillon
(74) *Attorney, Agent, or Firm* — Lee & Hayes, PLLC

(57) ABSTRACT

An unmanned aerial vehicle (UAV) may include stereo cameras that include a left camera and a right camera. The cameras may capture a majority of images in black and white, which may be captured in a single color channel. At certain times during a flight, the UAV may be configured to generate colorized images. To generate colorized images, the camera may capture a first image using a default color channel (e.g., green), which may be used for black and white images, and then selectively apply a color filter to capture a second image associated with a different color channel than the first image. A multi-channel color image may be created using at least the first image and the second image. By adding a third image in the remaining color channel, the created image may be generated as a red-green-blue image.

20 Claims, 10 Drawing Sheets

(56) References Cited

U.S. PATENT DOCUMENTS

| | | | |
|---|---|---|---|
| 2011/0115882 A1* | 5/2011 | Shahinian | A61B 1/00193 |
| | | | 348/45 |
| 2013/0176423 A1 | 7/2013 | Rischmuller et al. | |
| 2016/0232423 A1* | 8/2016 | Zhong | G06K 9/52 |
| 2016/0234441 A1* | 8/2016 | Tiana | G01S 13/953 |

* cited by examiner

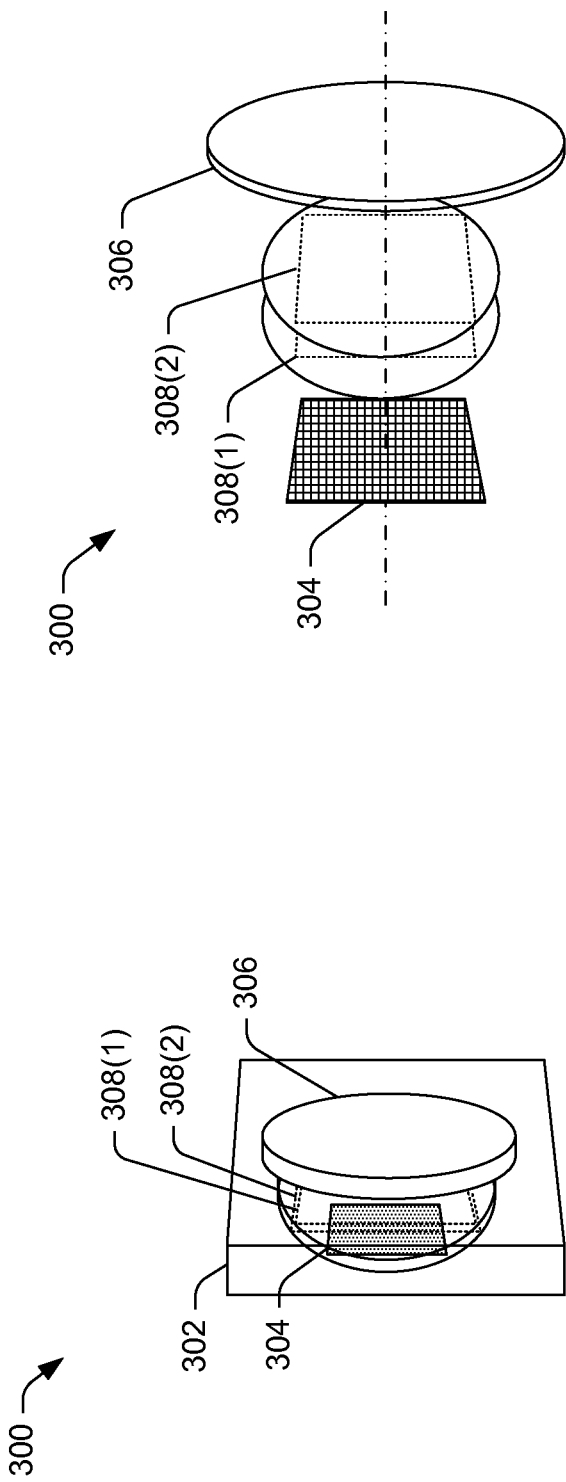

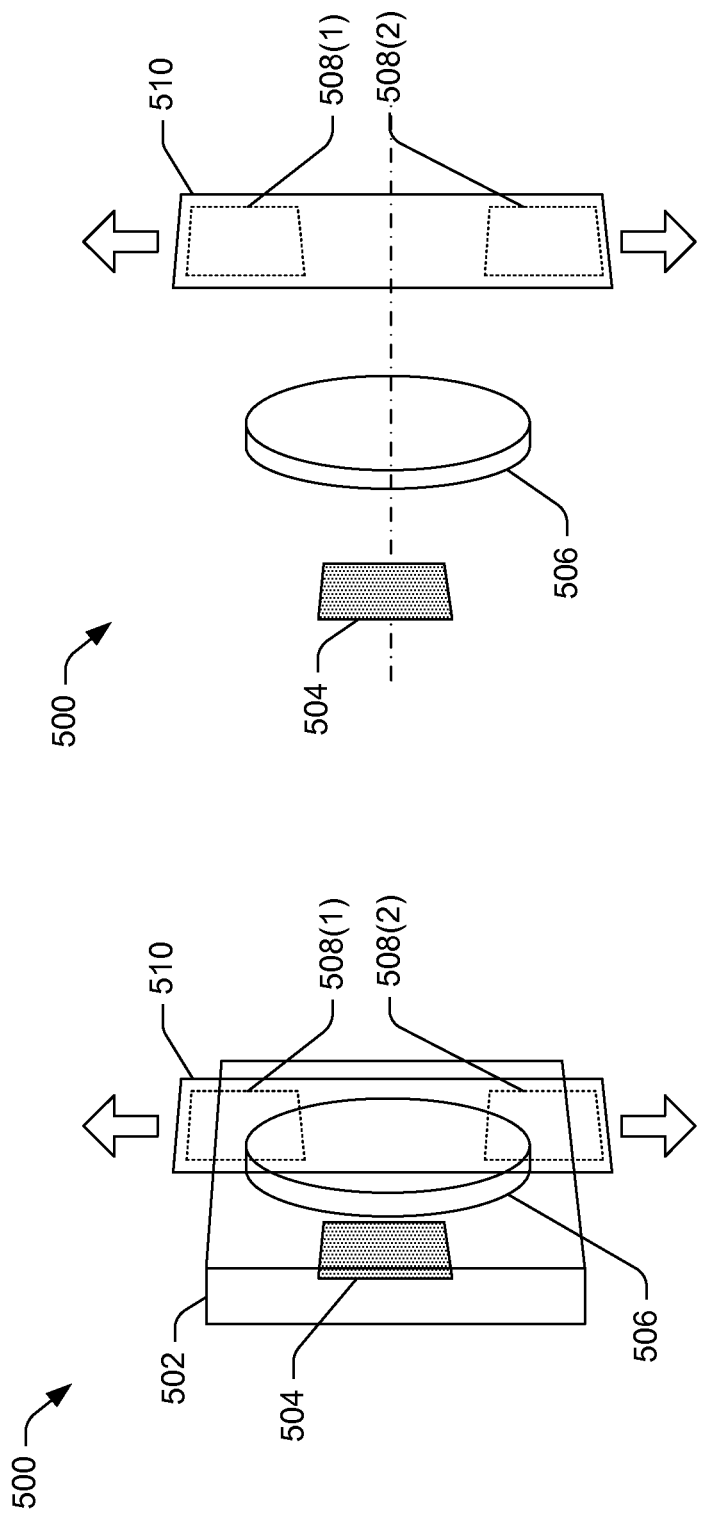

SELECTIVE COLORIZATION USING MONOCHROMIC IMAGERY

BACKGROUND

Cameras are commonly included in many electronic devices including notebook computers, tablet computers, mobile telephones, and televisions. These cameras are primarily used to capture still images or video, such as during a video call or to record a personal video. Although most cameras record in color, some cameras record in black and white for various purposes, such as reduce processing demands associated with larger files. Because black and white images are single channel images, they tend to use less storage space and are processed faster as compared to multi-channel color images, such as images having red, green, and blue (RGB) channels. The black and white images may be analyzed to detect objects, determine changes in scenery, and for other analytical purposes. However, even when using black and white imagery, there may be times that color images may be helpful to more quickly or accurately identify an object, such as a red car from an aerial view of a neighborhood.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1 shows illustrative image frames, where a colorized image is shown as being generated partially from a black and white image.

FIG. 3A is a side perspective view of a camera having one or more electronic color filters used to enable selective colorization using monochromatic imagery.

FIG. 3B is an exploded view of FIG. 3A.

FIG. 5A is a side perspective view of a camera with a filter slider used to enable selective colorization using monochromatic imagery.

FIG. 5B is an exploded view of FIG. 5A.

DETAILED DESCRIPTION

Figure 1:
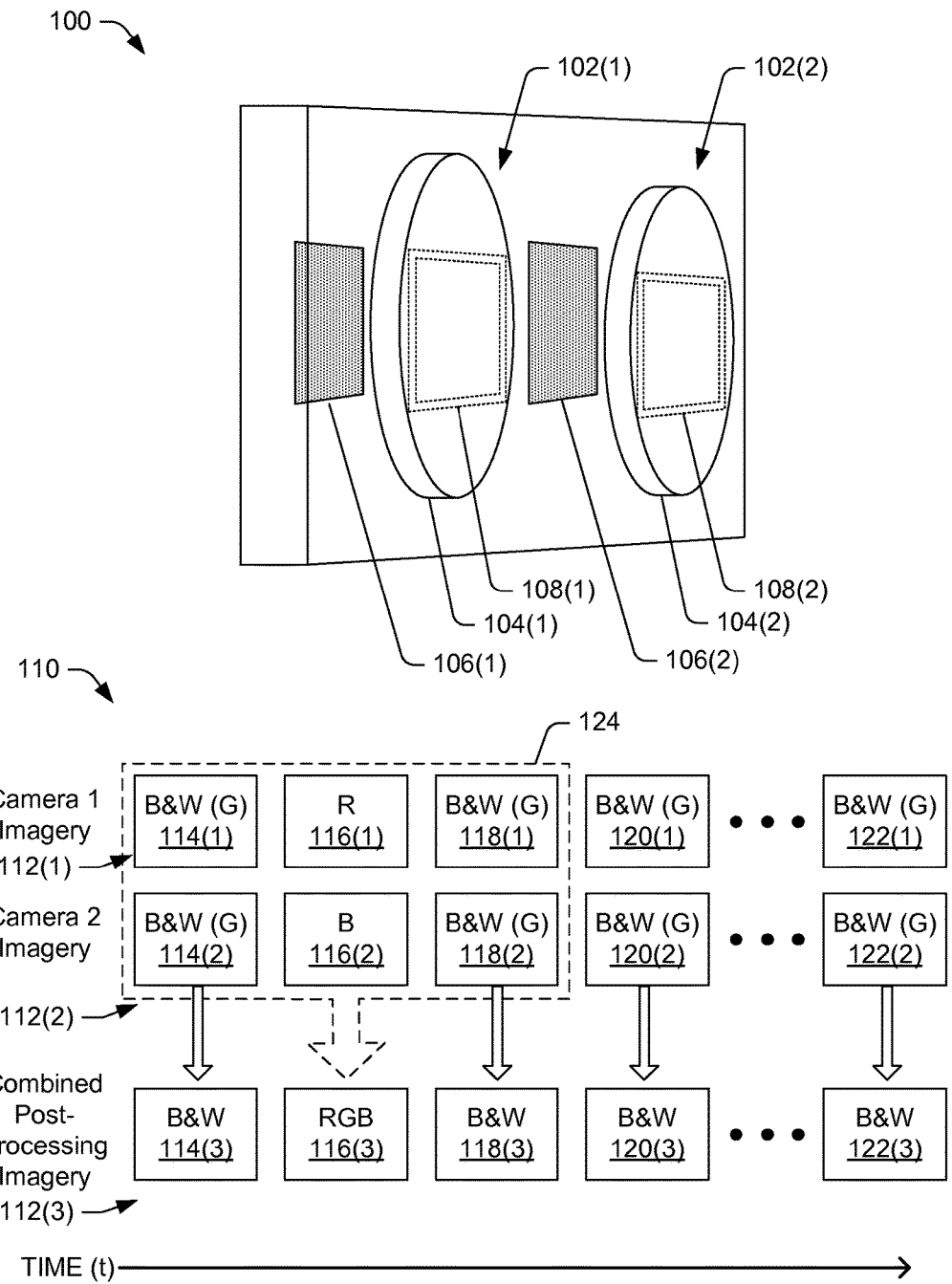
FIG. 1 is a schematic diagram of a camera configured for selective colorization using monochromatic imagery.

This disclosure is directed at least partly to selectively creating multi-channel color images using monochromatic images. An unmanned aerial vehicle (UAV) may include stereo cameras that include a left camera and a right camera. The cameras may capture a majority of images in black and white, which may be captured in a single color channel. Although the disclosure discusses capture of black and white images using the green color channel (i.e., luminance (Y) channel), the black and white images may be captured using a different color channel, such as the red color channel or the blue color channel. At certain times during a flight, the UAV may be configured to generate colorized images. As discussed herein, colorized images have color information for at least two different color changes, and thus may be at least red-green, red-blue, or blue-green. Alternatively, full color may be generated using cyan, magenta, and yellow (CMY). Either color groups could be used to perform the techniques discussed herein. However, full color images red-green-blue (RGB) may be generated. To generate colorized images, the camera may capture a first image using a default color channel (e.g., green), which may be used for black and white images, and then selectively apply a color filter to capture a second image associated with a different color channel than the first image. The first image and the second image may be combined to create a multi-channel colorized image. By adding a third image in the remaining color channel, the combined image may be generated as a RGB image.

The filter or filters may be implemented in various ways to enable selective use of each filter. In some embodiments, a camera may be configured with one or more electronic color filters that selectively transition between a transparent state and a color filter state, when exposed to a current or other change in electrical attributes. In various embodiments, the filters may be physically moved in front of or behind a lens of the camera, such as using a back-and-forth linear motion mechanism or using a rotatable wheel that align a filter with a lens and image sensor of a camera.

The use of the color filters may be triggered by various different events. In some embodiments, a difference between subsequent images may be compared to a threshold value that, when reached or exceed, causes use of one or more filters and subsequent generation of a colorized image. Other triggers may include changes in navigation or flight path of the UAV, passage of time, sensor data, and/or use of other information.

In accordance with one or more embodiments, a camera may selectively be configured to capture infrared imagery and/or other types of imagery, such as by selectively applying or using additional hardware. For example, an infrared sensor may be selectively used to capture infrared imagery for a single frame or for multiple frames in succession before and/or after capturing black and white images.

The apparatuses, systems, and techniques described herein may be implemented in a number of ways. Example implementations are provided below with reference to the following figures.

FIG. 1 is a schematic diagram of an illustrative stereo camera device 100 configured for selective colorization using monochromatic imagery. FIG. 1 shows illustrative image frames, where a colorized image is shown as being generated partially from one or more black and white images. The stereo camera device 100 may be used to provide at least some depth information, which may be used for navigating an unmanned aerial vehicle, among other possible uses.

The stereo camera device 100 may include a first camera 102(1) and a second camera 102(2). The first camera 102(1) may include a first lens 104(1) and a first image sensor 106(1) while the second camera 102(2) may include a second lens 104(2) and a second image sensor 106(2). The first camera 102(1) and the second camera 102(2) may be configured to capture images in a single color channel, which may result in image data this uses less data and computing resources as compared to full color images. For illustrative purposes, the camera may capture black and white images using the green (G) color channel, and thus the black and white image may include information about levels of the color green in an image.

In accordance with one or more embodiments, the first camera 102(1) may include a first electronic color filter 108(1) associated with a color different than the black and white (green) channel. For example the first electronic color filter 108(1) may be associated with the red (R) color channel. Thus, when the first electronic color filter 108(1) is activated, such as by applying a current to the first electronic color filter 108(1), the first image sensor 106(1) may capture imagery associated with the red color channel. The second camera 102(2) may include a second electronic color filter 108(2) associated with a color different than the black and white (green) channel and different than the first electronic color filter 108(1). For example the second electronic color filter 108(2) may be associated with the blue (B) color channel. Thus, when the second electronic color filter 108(2) is activated, such as by applying a current to the second electronic color filter 108(2), the second image sensor 106 (1) may capture imagery associated with the blue color channel.

Illustrative image frames 110 may be captured and/or generated using the stereo camera device 100. The image frames 110 are shown with respect to a time (t). Images may be captured at 24 Hz or any other frequency, or may be captured at different times (on demand, based on distance traveled, etc.). A first set of image frames 112(1) may be generated by the first image sensor 106(1) over time while a second set of image frames 112(2) may be generated by the second image sensor 106(2) over time. The first set of image frames 112(1) may include a first black and white image 114(1) captured in the green color channel while the first electronic color filter 108(1) is in a transparent state, followed by a red image 116(1) captured in the red color channel while the first electronic color filter 108(1) is in a red filter state. Additional images 118(1), 120(1), . . . 122(1) may be captured as black and white images and/or as red images. The second set of image frames 112(2) may include a second black and white image 114(2) captured in the green color channel while the second electronic color filter 108(2) is in a transparent state, followed by a blue image 116(2) captured in the blue color channel while the second electronic color filter 108(2) is in a blue filter state. Additional images 118(2), 120(2), . . . 122(2) may be captured as black and white images and/or as blue images.

At least some of the images in the first set of image frames 112(1) and the second set of image frames 112(2) may be combined, using a differencing module, to create a multi-channel color image 116(3). For example, at last some images within a group of images 124 may be used to create a multi-channel color image, such as a RGB image. However, the multi-channel image may also be generated as a RG image, a GB image, or a RB image. In some embodiments, a multi-channel image may be generated using secondary colors or other non-primary colors, such as violet, pink, and so forth, which may enable detection of specific objects or may be used for other reasons. A third set of image frames 112(3) may represent combined post-processing imagery, which includes images 114(3), 116(3), 118(3), 120(3), . . . 122(3), which may include any number of black and white images and any number of multi-channel color images, such as the multi-channel color image 116(3).

Figure 2:
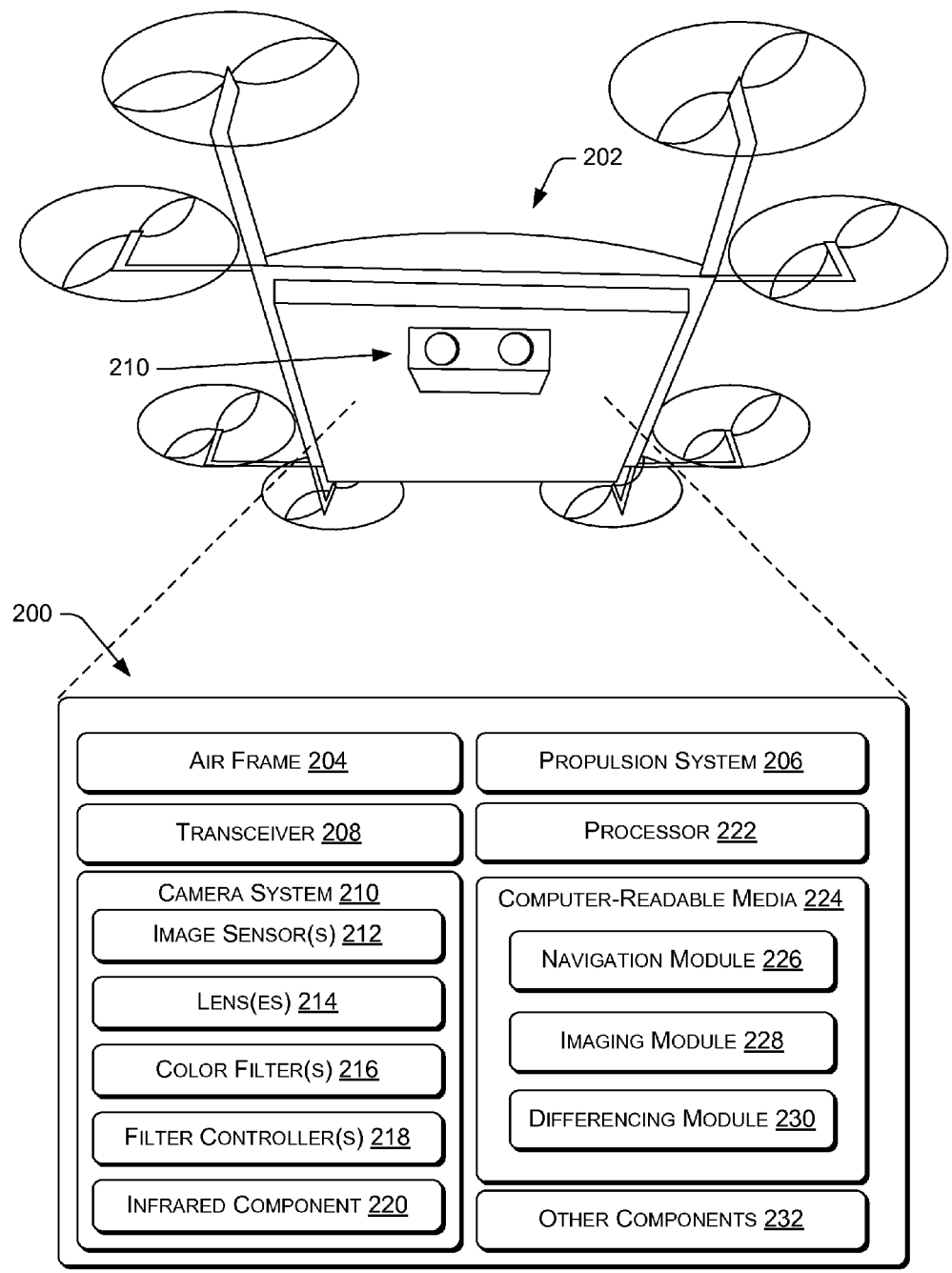
FIG. 2 is a block diagram of components of an unmanned aerial vehicle (UAV) that includes a monochromatic camera.

FIG. 2 is a block diagram of illustrative components 200 of an unmanned aerial vehicle (UAV) 202 that includes a monochromatic camera. The components 200 are discussed below in detail. Some embodiments of the UAV 202 may include fewer or more (different) components.

The UAV 202 may include an airframe 204, which may be used to secure and/or couple other components. The airframe may be configured to support a multi-rotor UAV capable of vertical takeoff and landing. A propulsion system 206 may include propulsion units, and controllers to propel the UAV in flight. In some embodiments, the propulsion units may include multiple electronic motors, each configured to drive a different rotor. The electronic motors may be controlled by the controller to cause the UAV to perform various flight tasks, such as to deliver a package to a destination.

The UAV 202 may include a transceiver 208 to enable the UAV to send/receive data to/from another device, such as a central controller, which may be a remote computing device that sends navigation information to the UAV, receives global positioning system (GPS) information from the UAV, receives images from the UAV, and/or exchanges other data with the UAV.

The UAV 202 may include a camera system 210. The camera system 210 may include one or more cameras, depending on the use of the camera system 210. The camera system 210 may be used to primarily capture black and white imagery used for navigational purposes (e.g., object avoidance, landing, takeoff, etc.). The camera system 210 may include image sensor(s) 212 used to convert light to signals, which can be stored to represent an image of an environment at a point in time. The camera system 210 may include lens(es) 214 to direct light onto respective ones of the image sensor(s) 212. In accordance with one or more embodiments, the camera system 210 may include color filter(s), which may filter light to cause an image sensor to capture light associated with a particular color channel, such as the red channel, the blue channel, or the green channel. The color filter(s) 216 may include or may be coupled to mechanical and/or electrical components that enable the color filter(s) 216 to be selectively used, under control of filter controller(s) 218, and thus only modify light for some of the light captured by the respective image sensors. In a first state or orientation, the color filters may cause color filtered light to reach the image sensor while in a second state or orientation, the color filters may be in a transparent state or not aligned with a respective image sensor, and thus not modify light captured by the image sensor. Each color filter may operate independent of other color filters or may be synchronized with other color filters. Illustrative configurations of the color filter(s) 216 is shown and described with reference to FIGS. 3A, 3B, 4A, 4B, 5A, and 5B.

In some embodiments, the camera system 210 may be configured with an infrared component 220. The infrared component 220 may enable capture of infrared light, possibly using at least some components of the camera system 210. The infrared component 220 may include use of one or more of an infrared filter that allows infrared light to pass through the filter (or removal of an infrared cut-off filter that blocks infrared light), use of a special image sensor having high sensitivity, and/or use of a special lens to enhance capture of infrared light. These components may be moved or activated to enable use with the camera, possibly using some of the techniques shown in FIGS. 3-5. The use of the infrared component 220 is described in further detail with reference to FIG. 9. The infrared component 220 may be controlled in a same or similar way as described herein for some of the color filters, such as shown and described with reference to FIGS. 3A, 3B, 4A, 4B, 5A, and 5B.

The UAV 202 may include one or more processors 222 and one or more computer readable media 224 that stores various modules, applications, programs, or other data. The computer-readable media 224 may include instructions that, when executed by the one or more processors 222, cause the processors to perform the operations described herein for camera system 210.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 224 may store a navigation module 226, an imaging module 228, and a differencing module 230, which are described in turn. The components may be stored together or in a distributed arrangement.

The navigation module 226 may determine navigational information which may be used to determine when to activate one of the filter controller(s) to cause capture of a different color channel of imagery. For example, the navigational module 226 may cause a trigger at certain altitudes, at certain waypoints, at or near a destination, when encountering an obstacle, after changes in heading greater than a threshold amount, and so forth. The navigational module 226 may identify triggers that result in generation of multi-channel colorized image instead of black and white images, which are a primary type of image captured by the camera system 210.

The imaging module 228 may determine image information which may be used to determine when to activate one of the filter controller(s) to cause capture of a different color channel of imagery. For example, the imaging module 228 may analyze consecutive images or images within a predetermined time frame to determine an amount of change of attributes between the images. The amount of change may be based on overall pixel changes, a change in light, a change in histograms, and/or other metrics that can be used to describe a difference between images. The imaging module 228 may identify triggers that result in generation of multi-channel colorized images instead of black and white images, which are a primary type of image captured by the camera system 210. In some embodiments, the imaging module 228 and the navigational module 226 may work cooperatively to identify and/or generate triggers.

The differencing module 230 may be used to combine multiple monochromatic images (frames) from one or more camera into a multi-channel image. For example, the differencing module 230 may combine a green-channel monochromatic image (possibly used to represent black and white imagery) with a red-channel monochromatic image, a blue-channel monochromatic image, or both. The differencing module 230 may create a RGB image, a RG image, a RB image, or a GB image. In some embodiments, the differencing module may average multiple frames, such as a first and third frame, such as when the second frame includes imagery subjected to a color filter. By averaging the first and third frames in this example, the resultant averaged frame may more closely align with the imagery captured in the second frame. The second frame and the averaged frame may then be combined to create a multi-channel colorized image.

The resulting multi-channel colorized image may be used by the propulsion system 206 for control of the propulsion unit, may be transmitted to the central controller for processing, and/or may be used for other purposes, such as to identify an unknown obstacle, confirm identify of a location or reference point, or depict a deposited package at a destination.

The UAV 202 may include other components 232, which may include a power source, a GPS receiver, speakers, microphones, various other sensors, and/or other components typically included in a UAV or other type of aircraft. Other sensors may include proximity sensors, radio sensors, microphones, vibration sensors, and so forth. These sensors may be used to trigger capture of multi-channel color images as discussed herein.

FIG. 3A is a side perspective view of a camera 300 having one or more internal electronic filters used to enable selective colorization using monochromatic imagery. The camera 300 may include a housing 302 which may secure and couple multiple components including an image sensor 304, a lens 306, and electronic color filters 308(1) and 308(2). The electronic color filters 308(1)-(2) may be designed to transition between different operational states in response to a change in signal (e.g., current) from a transparent state to a color filter state. Thus, the filters may be stationary, and may only be used based on presence or absence of one or more signals.

The electronic color filter 308(1) may associated with a first color (e.g., red) while the electronic color filter 308(2) may be associated with a second color (e.g., blue), assuming the camera 300 captures green channel imagery when the electronic color filters 308(1)-(2) are operating in the transparent state. During operation, the image sensor 304 may capture imagery associated with the green color channel with the electronic color filters 308(1)-(2) are in the transparent state. When the electronic color filter 308(1) is in the first color state (e.g., red) and the electronic color filter 308(2) is in the transparent state, then the image sensor 304 may capture imagery associated with the red color channel. When the electronic color filter 308(2) is in the second color state (e.g., blue) and the electronic color filter 308(1) is in the transparent state, then the image sensor 304 may capture imagery associated with the blue color channel. In some embodiments, an additional electronic color filter may be associated with a third color state (e.g., green), which may be used to enable capture of the green color channel, possibly even for use to create the black and white imagery.

FIG. 3B is an exploded view of FIG. 3A. FIG. 3B shows the internal configuration of the electronic color filters 308(1)-(2) located in the near field between the lens 306 and the image sensor 304. However, the electronic color filters 308(1)-(2) may be located in the far field on the outside of the lens 306 relative to the image sensor 304. Although the camera 300 shows two electronic color filters, more or fewer electronic color filters may be used in or with the camera 300. Further, the electronic color filters may be configured for use with an existing camera, such as when mounted in the far field, as discussed above.

Figure 4A:
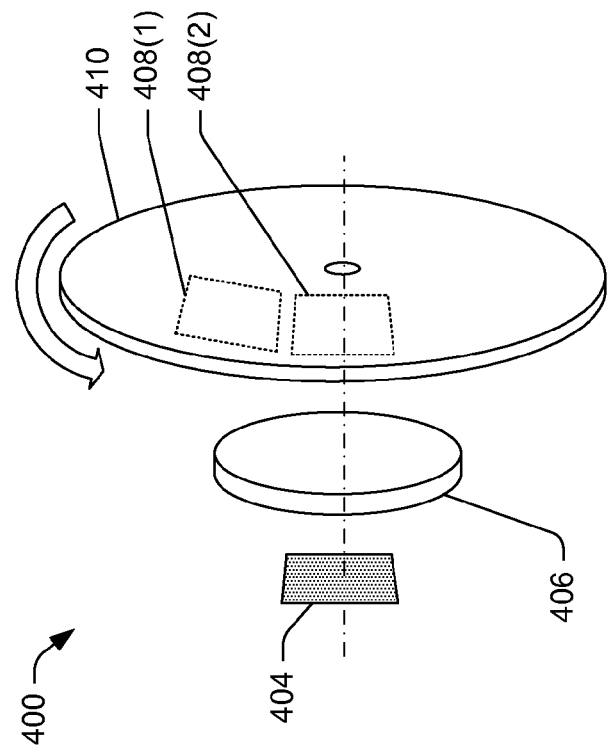
FIG. 4A is a side perspective view of a camera with a filter wheel used to enable selective colorization using monochromatic imagery.

FIG. 4A is a side perspective view of a camera 400 with a filter wheel used to enable selective colorization using monochromatic imagery. The camera 400 may include a housing 402 which may secure and couple multiple components including at least an image sensor 404, a lens 406, and color filters 408(1) and 408(2). The color filters 408(1)-(2) may be coupled to a filter wheel 410, which may controllably rotate to cause light to be filtered by a respective filter prior to reaching the image sensor 404. For example, the filter controller(s) 218 shown in FIG. 2 may control a motor to cause rotation of the filter wheel 410. The filter wheel 410 may be rotated to place one of the filters (or no filters) in alignment with the lens 406 and image sensor 404 to cause filtering of light into a single color channel (or no filtering of light). Thus, the filters 408(1)-408(2) may be movable, and may only modify light captured by the image sensor 404 when rotated into an aligned position. The color filter 408(2) is shown in FIG. 4A in the aligned position. Counterclockwise rotation (from the position shown in FIG. 4A, from a reference point external of the camera) of the filter wheel 410 may cause alignment of the color filter 408(1) with the image sensor 404 and lens 406 while clockwise rotation (from the position shown in FIG. 4A) of the filter wheel 410 may cause no filtering of light (or possibly filtering to capture the green color channel).

The color filter 408(1) may be associated with a first color (e.g., red) while the color filter 408(2) may be associated with a second color (e.g., blue), assuming the camera 400 captures green channel imagery when the color filters 408(1)-(2) are not aligned with the image sensor 404 and the lens 406. During operation, the image sensor 404 may capture imagery associated with the green color channel when the color filters 408(1)-(2) are not aligned with the image sensor 404 and the lens 406. When the color filter 408(1) is aligned with the image sensor 404 and the lens 406, then the image sensor 404 may capture imagery associated with the red color channel. When the color filter 408(2) is aligned with the image sensor 404 and the lens 406, then the image sensor 404 may capture imagery associated with the blue color channel. In some embodiments, an additional color filter may be associated with a third color state (e.g., green), which may be used to enable capture of the green color channel, even as black and white imagery. Thus, another portion of the filter wheel 410 may be a green color filter and/or transparent.

Figure 4B:
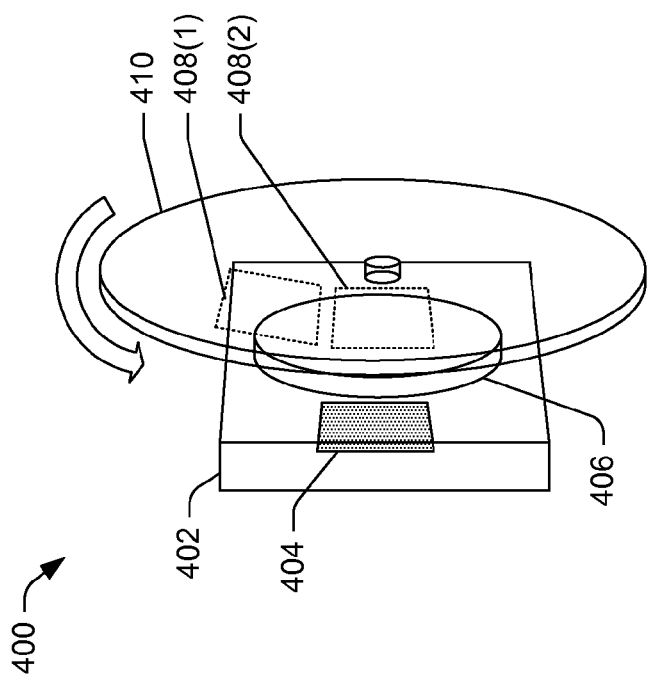
FIG. 4B is an exploded view of FIG. 4A.

FIG. 4B is an exploded view of FIG. 4A. FIG. 4B shows the internal configuration of the color filters 408(1)-(2) located in the far field on the outside of the lens 406. However, the color filters and filter wheel 410 may be located between the lens 406 and the image sensor 404. Although the camera 400 shows two color filters, more or fewer color filters may be used in or with the camera 400. Further, the color filters may be configured for use with an existing camera, such as when mounted in the far field, as discussed above. Although the discussion of the camera 400 primarily discusses color filters, other components may be selectively activated and/or moved into alignment for use with the camera, such as the infrared component 220 shown in FIG. 2.

FIG. 5A is a side perspective view of a camera 500 with a filter slider used to enable selective colorization using monochromatic imagery. The camera 500 may include a housing 502 which may secure and couple multiple components including at least an image sensor 504, a lens 506, and color filters 508(1) and 508(2). The color filters 508(1)-(2) may be coupled to a filter slider 510, which may be modulated between different positions to cause light to be filtered by a respective filter prior to reaching the image sensor 504. For example, the filter controller(s) 218 shown in FIG. 2 may control an actuator to cause movement of the filter slider 510. The actuator may be a motor, a solenoid, and/or other similar electronic, mechanical, or electromechanical devices. The filter slider 510 may be moved to place one of the filters (or no filters) in alignment with the lens 506 and image sensor 504 to cause filtering of light into a single color channel. Thus, the filters 508(1)-508(2) may be movable, and may only modify light captured by the image sensor 504 when moved into an aligned position. Movement of the filter slider 510 in an upward direction as shown in FIG. 5A may position the color filter 508(2) in the aligned position. Movement of the filter slider 510 in a downward direction as shown in FIG. 5A may position the color filter 508(1) in the aligned position. No movement of the filter slider 510 as shown in FIG. 5A may cause no filtering of light (or possibly filtering to capture the green color channel).

The color filter 508(1) may be associated with a first color (e.g., red) while the color filter 508(2) may be associated with a second color (e.g., blue), assuming the camera 500 captures green channel imagery when the color filters 508(1)-(2) are not aligned with the image sensor 504 and the lens 506. During operation, the image sensor 504 may capture imagery associated with the green color channel when the color filters 508(1)-(2) are not aligned with the image sensor 504 and the lens 506. When the color filter 508(1) is aligned with the image sensor 504 and the lens 506, then the image sensor 504 may capture imagery associated with the red color channel. When the color filter 508(2) is aligned with the image sensor 504 and the lens 506, then the image sensor 504 may capture imagery associated with the blue color channel. In some embodiments, an additional color filter may be associated with a third color state (e.g., green), which may be used to enable capture of the green color channel, even as black and white imagery. Thus, another portion of the filter slider 510 may be a green color filter and/or transparent portion.

FIG. 5B is an exploded view of FIG. 5A. FIG. 5B shows the internal configuration of the color filters 508(1)-(2) located in the far field on the outside of the lens 506. However, the color filters and filter slider 510 may be located between the lens 506 and the image sensor 504. Although the camera 500 shows two color filters, more or fewer color filters may be used in or with the camera 500. Further, the color filters may be configured for use with an existing camera, such as when mounted in the far field, as discussed above. Although the discussion of the camera 500 primarily discusses color filters, other components may be selectively activated and/or moved into alignment for use with the camera, such as the infrared component 220 shown in FIG. 2.

FIGS. 6 and 8-10 are flow diagrams of various processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
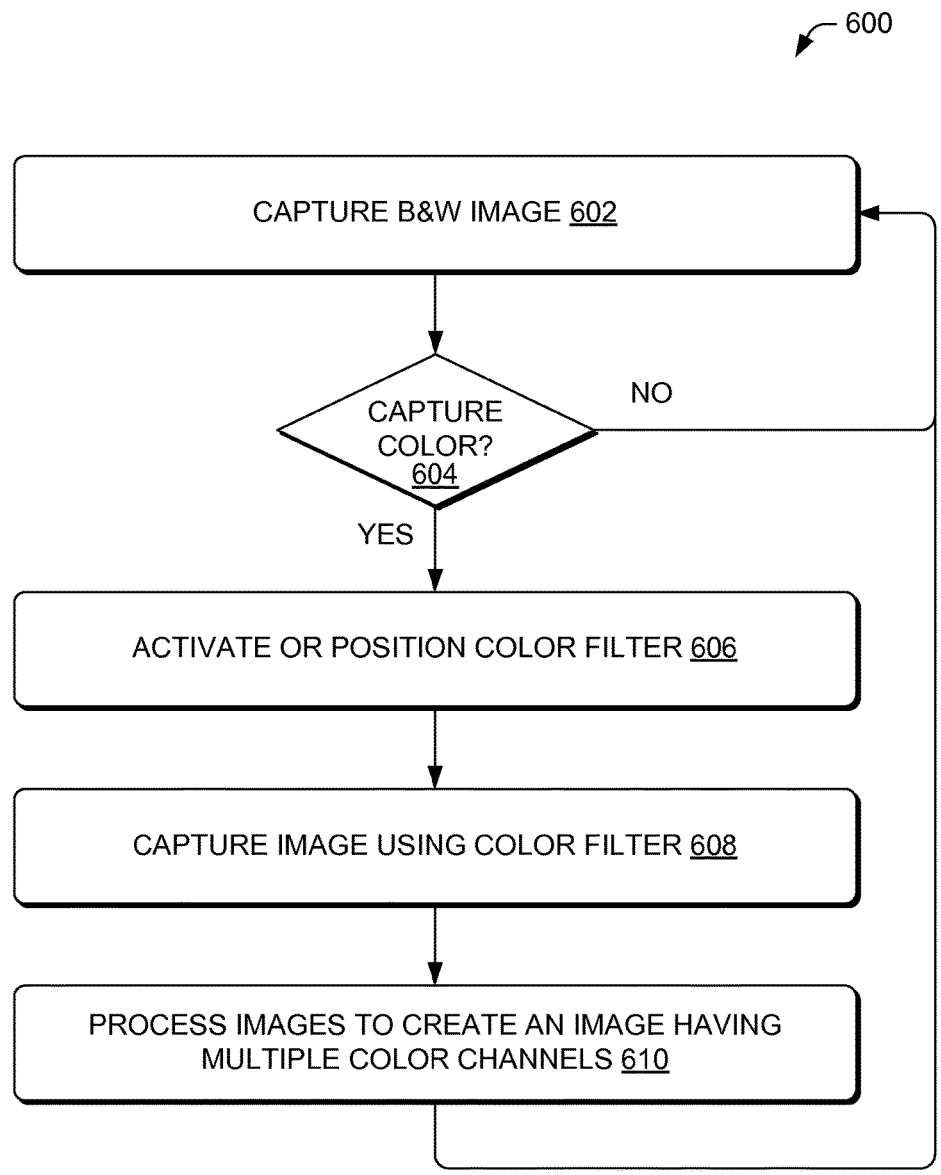
FIG. 6 is a flow diagram of an illustrative process to selectively colorize an image using monochromatic imagery.

FIG. 6 is a flow diagram of an illustrative process 600 to selectively colorize an image using monochromatic imagery. The process 600 is described with reference to the preceding figures, and may be performed by the components 200 described with reference to FIG. 2.

At 602, a camera may capture, using an image sensor, a black and white image that is associated with a color channel. For example, the black and white image may be associated with the green color channel, such that green objects (grass, trees, etc.) are show in white or light gray and objects without a green color component, which are shown as black. The black and white image may include any amount of greyscale, but may not depict color. By storing the image in black and white, the image data may be processed with less computational resources (time, devices) and/or may be stored using less data storage space.

At 604, the camera system and/or a controller may determine whether to capture a color image using multiple color channels. For example, the determination may be performed by the navigation module 226 and/or the imaging module 228 in response to analysis of associated data. This process is described in more detail with reference to FIG. 8. When no color image is requested at the decision operation 604, then the process 600 may advance to the operation 602 and continue to obtain black and white images. However, when a color image is requested (following the "yes" route from the decision operation 604), then the process 600 may advance to an operation 606.

At 606 the camera system may activate or position a color filter to cause capture of an image having a different color channel than the image captured at the operation 602. The camera system may activate an electronic color filter, such as described above with reference to FIG. 2. The camera system may move a color filter into alignment with the lens and image sensor using one or more of the processes described above with reference to FIGS. 3 and 4 to cause the image sensor to capture light filtered by the color filter.

At 608, the camera system may capture an image associated with a different color channel than the image captured at the operation 602. The image may be stored in memory or cache, and used to generate a multi-channel color image.

At 610, the differencing module 230 may process multiple images to create an image having multiple color channels. For example, the differencing module 230 may combine the image captured at the operation 602 and the image captured at the operation 608 to create a multi-channel color image, which may have two or more color channels. In some embodiments, additional images may be used to create the multiple channel color image, which may be a RGB image, a RG image, a RB image, or a BG image. In various embodiments, multiple images captured at the operation 602 may be averaged and then used to create the multiple channel color image. For example, a black and white image captured via the operation 602 and captured just before the operation 608 may be averaged with a black and white image captured via the operation 602 and captured just after the operation 608. The averaging may be used to create a resulting image that more closely aligns with the image captured at a same time as the occurrence of the operation 608. The process 600 may continue, via a loop, and return to the operation 602 following the operation 610.

Figure 7:
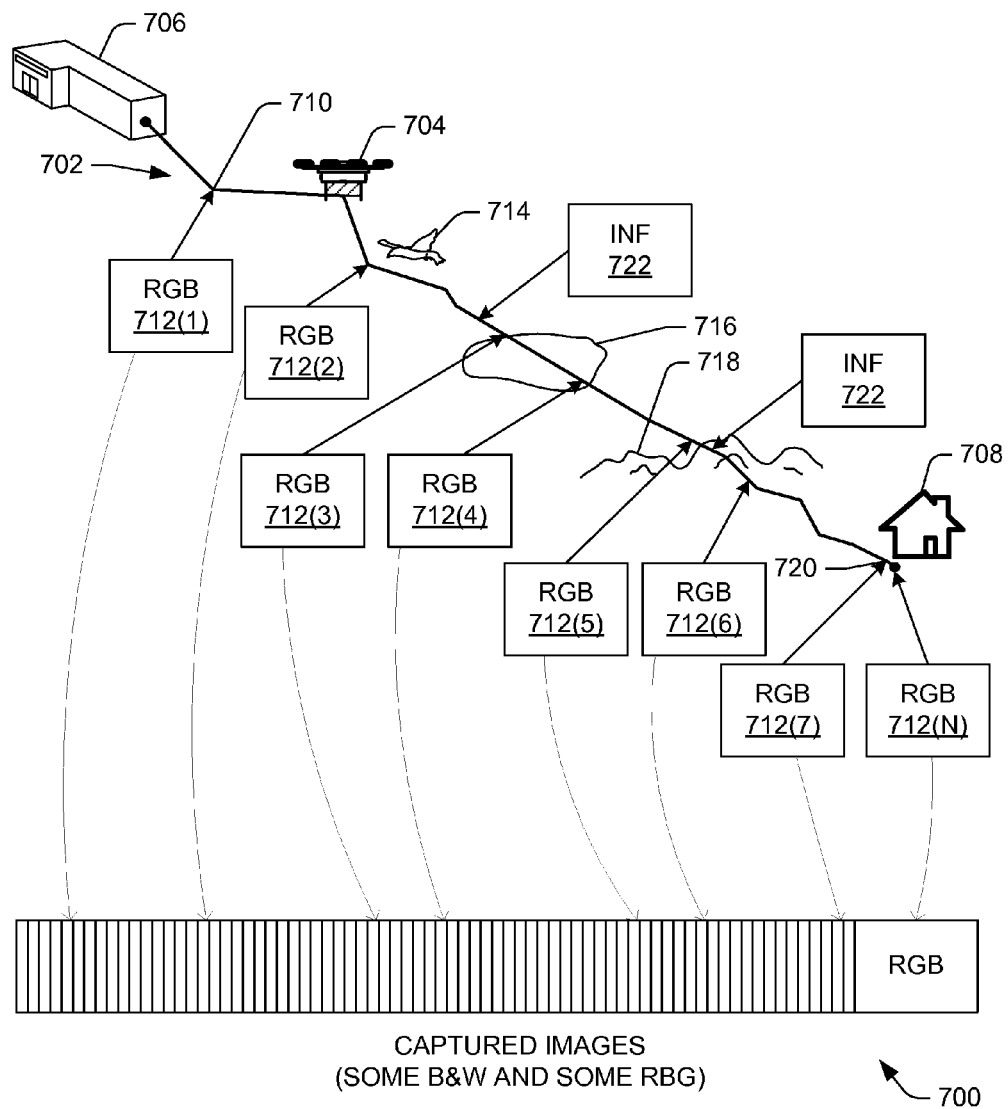
FIG. 7 is a schematic diagram of imagery obtained during a sample flight.

FIG. 7 is a schematic diagram of illustrative imagery 700 obtained during a flight 702 of a UAV 704. The flight 702 may extend between an origination location 706, such as a fulfillment center, and a destination 708, such as a customer's residence. During the flight 702, the UAV 704 may make navigational adjustments, which may be captured by the navigation module 226. For example, the UAV 704 may make substantial changes in direction and heading at various times during the flight 702. The camera system 210 may capture black and white imagery during the flight 702, which may be a portion of the imagery 700. However, some of the imagery 700 may be desired to have multi-color channels to enable more accurately identifying object and/or for other reasons. During the flight 702, the imaging module 228 may analyze the captured images to determine a difference between images. This difference, which may be caused from changes in the environment around/below the UAV 704, may be detectable by the image module 228, such as by comparing changes in brightness of images, histogram data, overall changes in pixels, and so forth.

As shown in FIG. 7, the navigation module 226 may detect a change in heading at a first waypoint 710 and trigger a capture of an image being associated with a different color channel than a prior image. The differencing module 230 may then generate a multi-channel color image 712 (e.g. a RGB image, RG image, RB image, or GB image) associated with this trigger, which may be used for navigational purposes or other purposes.

As the flight 702 continues toward the destination 708, the navigation module 226 and/or imaging module 228 may trigger capture of other images of a different color channel to enable creation of other multi-channel color images 712(2)-(N). The triggers may include detection of an object 714 that may be better recognized using color imagery, such as another flying object (e.g., another UAV, a bird, another aircraft, a balloon, and/or other objects). For example, detection of the object 714 may trigger creation of a multi-channel color image, which may be analyzed to positively identify the object 714, possibly based on colored markings on the object 714. The triggers may include detected changes in scenery due to objects 716, 718 (e.g., water source, geographical feature/change) detected via the imaging module 228. When the UAV 704 approaches the destination 708, it may pass by a waypoint 720, which may trigger creation of a multi-channel color image 712(7) to positively identify the destination 708 and trigger creation of a multi-channel color image 712(N) to show deposit of a package at the destination, for example. More or fewer multi-channel color images may be created.

In some embodiments, when the UAV 704 is configured with the infrared component 220, the navigation module 226 and/or imaging module 228 may trigger capture of infrared imagery 722 using at least some shared resources of the camera system 210. The infrared component 220 may be used in response to other triggers such as in response to a request from a central controller (e.g., to detect a forest fire, etc.).

The imagery 700 may be captured at fixed intervals and/or at variable intervals based on the speed of flight and/or other factors. The creation of the multi-channel color images may also occur at fixed intervals and/or at variable intervals and/or in response to the triggers, as described above. A trigger may be initiated based on a duration of time since a last multi-channel color image was created. Capture of infrared images may be determined using a same or different technique as used for the creation of multi-channel color images.

Figure 8:
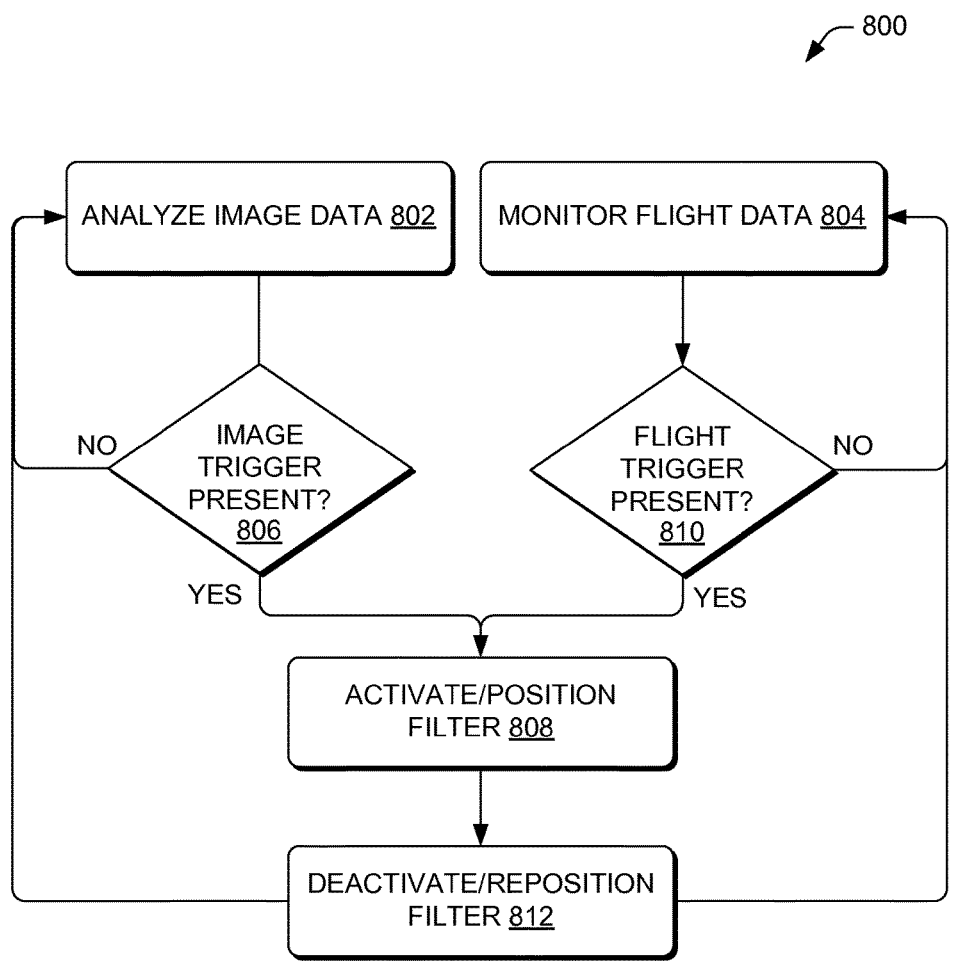
FIG. 8 is a flow diagram of an illustrative process to trigger creation of colorized imagery.

FIG. 8 is a flow diagram of an illustrative process 800 to trigger creation of colorized imagery. The process 800 is described with reference to the preceding figures, and may be performed by the components 200 described with reference to FIG. 2.

At 802, the imaging module 228 may analyze image data 802 of the black and white images to identify triggers to cause capture of an image having a different color channel that can be used to create a multi-channel color image. The analysis may include comparing consecutive images or other images to determine changes in light levels, histograms, pixel values, and/or other changes, which may be compared to a threshold used for a trigger. Thus, a trigger may occur when the threshold is reached or exceeded.

At 804, the navigation module 226 may analyze flight data to cause capture of an image having a different color channel that can be used to create a multi-channel color image. The analysis may include determining changes in heading, altitude, weather, objects, waypoints, and/or other navigational or flight data, which, when detected. The navigation information may also use thresholds, such as a threshold change in heading that causes generation of a trigger. The processes (and loops) associated with the operations 802 and 804 may operate in parallel, in series, or independently (possibly without the other).

At 806, the camera system 210 may determine whether a trigger is present in response to the operation 802. When a trigger is present, then the camera system 210 may activate/position the filter at 808 to enable capture of an image having a color channel that is different than a default color channel. When no trigger is present (following the "no" route from the decision operation 806), the process 800 may return to the operation 802.

At 810, the camera system 210 may determine whether a trigger is present in response to the operation 804. When a trigger is present, then the camera system 210 may activate/position the filter at 808 to enable capture of an image having a color channel that is different than a default color channel. When no trigger is present (following the "no" route from the decision operation 810), the process 800 may return to the operation 804.

At 812, following the operation 808, the camera system 210 may deactivate/reposition the filter to enable the camera system to resume capture of images in black and white at the operation 802. The process may then return to the operation 802 via a loop.

Figure 9:
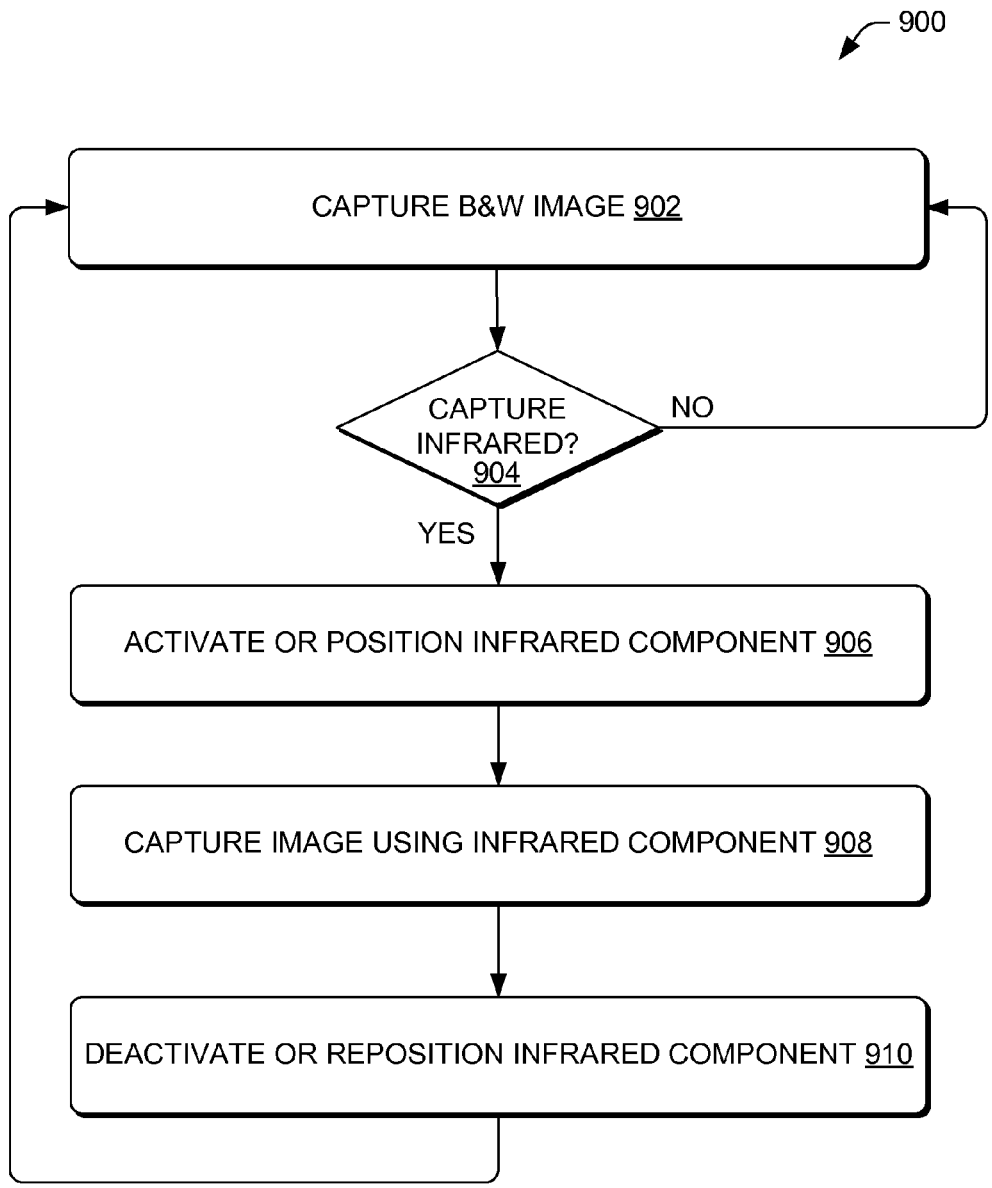
FIG. 9 is a flow diagram of an illustrative process to selectively obtain infrared imagery or other special imagery.

FIG. 9 is a flow diagram of an illustrative process 900 to selectively obtain infrared imagery or other special imagery. The process 600 is described with reference to the preceding figures, and may be performed by the components 200 described with reference to FIG. 2.

At 902, the camera system 210 may capture images in black and white. For example the operation 902 may be similar or the same as the operation 602 described above with reference to FIG. 6.

At 904, the camera system 210 may determine whether to capture an infrared image using the infrared component 220. For example, the navigation module 226 and/or the imaging module 228 may generate a trigger to cause capture of the infrared image. In some embodiments, the trigger may be generated by receipt of a request from a central controller, a passage of a predetermined amount of time, and/or signal data (e.g. a threshold change in temperature, etc.).

When the decision operation 904 determines not to capture an infrared image (following the "no" route from the decision operation 904), then the process 900 may return to the operation 902 and continue capture of black and white images. However, when the decision operation 904 determines to capture an infrared image, possibly from a trigger (following the "yes" route from the decision operation 904), then the process 900 may advance to an operation 906.

At 906, the camera system 210 may activate or position the infrared component 906 to enable capture of the infrared image. For example, the camera system 210 may use a controller (slider, rotatable wheel) to position the infrared component with one or more other components of the camera system 210 to enable capture of the infrared image. As discussed above, the infrared component 220 may be an infrared filter that allows infrared light to pass through the filter (or removal of an infrared cut-off filter that blocks infrared light), a special image sensor having high sensitivity, and/or a special lens to enhance capture of infrared light. As an example, the camera system 210 may move/position an infrared cut-off filter out of alignment between the lens and the image sensor to enable capture of infrared light. The movement may be performed as described above with reference to FIGS. 4 and 5. As another example, the camera system 210 may temporarily replace/reposition the lens or the image sensor with a special lens or image sensor, which may be actuated or rotatably positioned in alignment with other imaging components of the camera system for use to capture infrared images. In some embodiments, the infrared cut-off filter may be integrated with other filters (e.g., the red filter, the blue filter, etc.), and may be repositioned to allow infrared light to reach the image sensor.

At 908, the camera system 210 may capture one or more infrared image using the infrared component. At 910, the camera system 210 may deactivate or reposition the infrared component 906 to enable resuming capture of black and white images at the operation 902.

Figure 10:
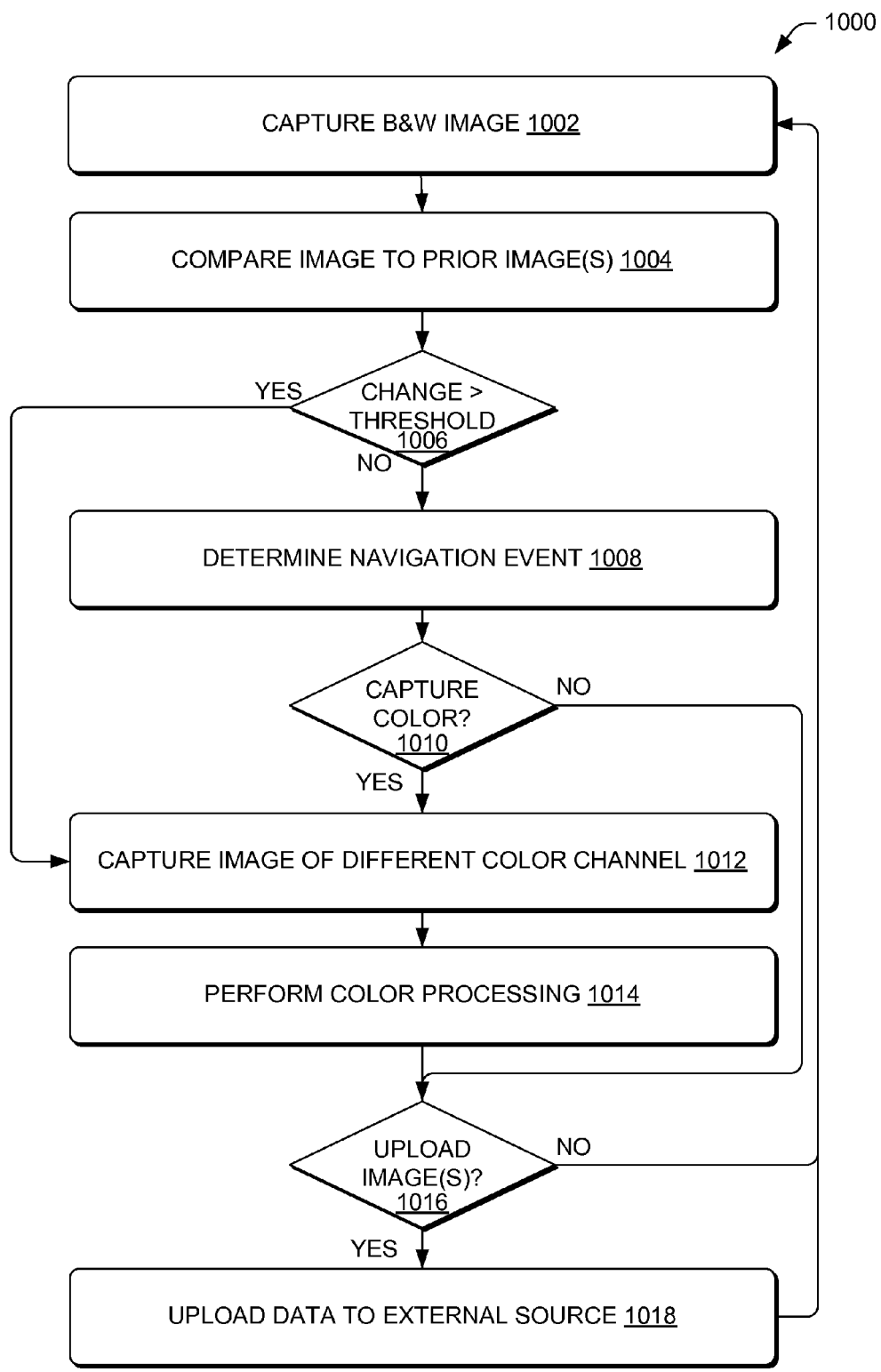
FIG. 10 is a flow diagram of an illustrative process to compare images to trigger further processing action associated with the imaging.

FIG. 10 is a flow diagram of an illustrative process 1000 to compare images to trigger further processing action associated with the imaging. The process 600 is described with reference to the preceding figures, and may be performed by the components 200 described with reference to FIG. 2.

At 1002, the camera system 210 may capture images in black and white. For example the operation 902 may be similar or the same as the operation 602 described above with reference to FIG. 6.

At 1004, the imaging module 228 may compare the black and white image obtained at the operation 1002 with a prior image to determine a change in attributes of the image. The comparison may be based on a change data by pixels, a change in light, a change in histograms, and/or other metrics that can be used to describe a difference between images. As an example, an introduction of a new object may initiate a trigger based in changes in pixel values and/or based on the detection of the object itself. In some embodiments, the detection of a particular object may cause the trigger.

At 1006, the imaging module 228 may determine whether a change in attributes is greater than a threshold based on the comparison from the operation 1004. When the change in attributes is not greater than a threshold value (following the "no" route from the decision operation 1006), then the process may advance to an operation 1008.

At 1008, the navigation module 226 may determine a navigation event that triggers capture of an image having a different color channel than the image associated with the operation 1002. For example, the navigation events may include a change in heading, a change in altitude, arrival at a waypoint, changes in weather sensed by navigation sensors, and/or other navigational events detected by the navigation module 226.

At 1010, the navigational module 226 may determine whether to capture color based on the navigation event determined at the operation 1008. For example, the navigational module 226 may determine to capture color when a change in heading that is greater than a threshold change, a change in altitude that is greater than a threshold change, the navigational event is an arrival at a waypoint, a change in weather sensed by navigation sensors is greater than a threshold change, and/or other navigational events reach or exceed associated thresholds. When the navigational module 226 determines to capture color at the decision operation 1010 (following the "yes" route from the decision operation 1010), or when the change from the comparison at the operation 1004 is greater than a threshold value (following the "yes" route from the decision operation 1006), then the process 1000 may advance to an operation 1012.

At 1012, an image having a different color channel than the image captured at the operation 1002 may be captured after activation/positioning of a filter in alignment with the lens and image sensor (or activation of an electronic color filter). The image may be captured in the red color channel, the blue color channel, or the green color channel. When multiple cameras are used, such as in a stereo camera system, one camera may capture one color channel when the other camera may capture a different color channel, possibly to enable creation of a RGB image. When only a single camera is used, a first frame may capture the red color channel while a subsequent frame may capture the blue color channel, or vice versa, assuming the image associated with the image captured at the operation 1002 is associated with the green color channel.

At 1014, the differencing algorithm 230 may perform color processing to combine multiple images to create a multi-channel color image. The differencing module 230 may combine a green-channel monochromatic image (possibly used to represent black and white imagery captured at the operation 1002) with a red-channel monochromatic image, a blue-channel monochromatic image, or both. The differencing module 230 may create a RGB image, a RG image, a RB image, or a GB image. In some embodiments, the differencing module 230 may average multiple frames, such as a first and third frame, such as when the second frame includes imagery subjected to a color filter. Following the operation 1014 or when the navigational module 226 determines not decide to capture color at the decision operation 1010 (following the "no" route from the decision operation 1010), the process 1000 may advance to a decision operation 1016.

At 1016, a determination may be made whether to upload one or more images to another device, such as a central controller. This operation may enable selective upload of images, while refraining from uploading other images. For example, images that are very similar to other images may not be uploaded with the similar image. Instead, only selective images may be uploaded to reduce computational costs and conserve power, among other reasons. Some images, such as color images generated at the operation 1014 may be uploaded while some images, but possibly not all, of the mages captured at the operation 1002 may not be uploaded. When an image or multiple images are selected for upload at the decision operation 1016 (flowing the "yes" route), then the process 1000 may advance to the operation 1018.

At 1018, the image or images may be uploaded to the external source, such as via the transceiver 208. Following the operation 1018, or when an image or multiple images are selected for upload at the decision operation 1016 (flowing the "yes" route), the process 1000 may advance to the operation 1002.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    capturing, using an image sensor, a first image as a black and white image associated with a first color channel;
    determining image information associated with the first image, wherein the information includes at least one of position information, navigation information, elevation information, image attribute information, or image capture information;
    analyzing the image information to detect a triggering event;
    detecting the trigger event in response to analyzing the image information; and
    in response to detecting the triggering event:
        causing light to pass through a color filter associated with a second color channel that is different than the first color channel;
        capturing a second image associated with the second color channel; and
        creating a multi-channel color image using the first image and the second image.

2. The method as recited in claim 1, further comprising, in response to detecting the trigger event:
    causing light to pass through a different color filter associated with a third color channel that is different than the first color channel and different than the second color channel; and
    capturing a third image associated with the third color channel; and
    wherein the creating the multi-channel color image further includes using the third image, the first image, and the second image to create a red-green-blue (RGB) image.

3. The method as recited in claim 1, further comprising transmitting a signal to an electronic color filter to cause the electronic color filter to transition from a transparent state to a color filter state.

4. The method as recited in claim 1, further comprising transmitting a signal to a motor to rotate a filter wheel that includes at least a transparent portion and the color filter.

5. The method as recited in claim 1, further comprising transmitting a signal to an actuator to actuate a filter slider to move between at least a first position and a second position, wherein the first position includes the color filter.

6. The method as recited in claim 1, wherein the second image is captured before the first image.

7. The method as recited in claim 1, wherein the analyzing includes comparing the information to a predetermined threshold that includes at least one of an obtained waypoint, a duration of a predetermined amount of time, a detection of an unknown object, or proximity to a destination to the predetermined threshold.

8. The method as recited in claim 1, wherein the navigation information includes a change in heading information and the elevation information includes a change in elevation information.

9. The method as recited in claim 1, wherein detecting the trigger event is further determined based in part on comparing an amount of change of the image attribute information between the first image and a prior image.

10. The method as recited in claim 9, wherein the image attribute information is at least one of an amount of light, a histogram, or a change in pixel values.

11. A system comprising:
an image sensor configured to capture at least a first image associated with at least one color channel;
one or more processors; and
one or more non-transitory computer-readable media storing instructions executable by the one or more processors, wherein the instructions program the one or more processors to perform operations comprising:
causing the image sensor to capture the first image as a black and white image associated with a first color channel;
determining information associated with the first image;
analyzing the information to detect a trigger event;
detecting the trigger event in response to analyzing the information; and
in response to detecting the triggering event:
causing light to pass through a color filter associated with a second color channel that is different than the first color channel;
causing the image sensor to capture a second image associated with the second color channel; and
creating a multi-channel color image using the first image and the second image.

12. The system of claim 11, further comprising, in response to detecting the triggering event:
causing light to pass through a different color filter associated with a third color channel that is different than the first color channel and different than the second color channel; and
causing the image sensor to capture a third image associated with the third color channel; and
wherein the creating the multi-channel color image further includes using the third image, the first image, and the second image to create a red-green-blue (RGB) image.

13. The system of claim 11, wherein the instructions program the one or more processors to perform operations further comprising:
transmitting a signal to an electronic color filter to cause the electronic color filter to transition from a transparent state to a color filter state.

14. The system of claim 11, wherein the instructions program the one or more processors to perform operations further comprising:
transmitting a signal to a motor to rotate a filter wheel that includes at least a transparent portion and the color filter.

15. The system of claim 11, wherein the system is an unmanned aerial vehicle (UAV).

16. One or more non-transitory computer-readable media maintaining instructions that, when executed by one or more processors, cause the one or more processors to perform operations comprising:
causing an image sensor to capture a first image as a black and white image associated with a first color channel;
determining information associated with the first image;
analyzing the information to detect a trigger event;
detecting the trigger event in response to analyzing the information; and
in response to detecting the triggering event:
causing light to pass through a color filter associated with a second color channel that is different than the first color channel;
causing the image sensor to capture a second image associated with the second color channel; and
creating a multi-channel color image using the first image and the second image.

17. The one or more non-transitory computer-readable media as recited in claim 16, wherein the second image is captured before the first image.

18. The one or more non-transitory computer-readable media as recited in claim 16, wherein the analyzing includes comparing the information to the predetermined threshold that includes at least one of an obtained waypoint, a duration of a predetermined amount of time, a detection of an unknown object, or proximity to a destination to the predetermined threshold.

19. The one or more non-transitory computer-readable media as recited in claim 16, wherein the information includes a change in heading information or change in elevation information.

20. The one or more non-transitory computer-readable media as recited in claim 16, wherein detecting the trigger event is further determined based in part on comparing an amount of change of at least one attribute between the first image and a prior image.

\* \* \* \* \*